United States Patent [19]

Dill

[11] 3,923,666
[45] Dec. 2, 1975

[54] METHOD AND COMPOSITION FOR ACIDIZING AND FRACTURING WELLS

[75] Inventor: Walter R. Dill, Duncan, Okla.

[73] Assignee: Halliburton Company, Duncan, Okla.

[22] Filed: Feb. 26, 1973

[21] Appl. No.: 336,150

[52] U.S. Cl. ... 252/8.55 C; 252/8.55 B; 252/8.55 R; 166/307; 166/308
[51] Int. Cl.² ........................................... C09K 3/00
[58] Field of Search ..... 252/8.55 B, 8.55 C, 8.55 R; 166/307, 308

[56] References Cited
UNITED STATES PATENTS

| | | | |
|---|---|---|---|
| 3,122,204 | 2/1964 | Oakes | 252/8.55 C |
| 3,179,171 | 4/1965 | Beale | 252/8.55 C |
| 3,252,904 | 5/1966 | Carpenter | 252/8.55 C |
| 3,434,971 | 3/1969 | Atkins et al. | 166/307 |
| 3,442,803 | 5/1969 | Hoover et al. | 252/8.55 R |
| 3,500,929 | 3/1970 | Eiler et al. | 252/8.55 C |

Primary Examiner—Leland A. Sebastian
Assistant Examiner—B. Hunt
Attorney, Agent, or Firm—Thomas R. Weaver; John H. Tregoning; William R. Laney

[57] ABSTRACT

A method of acidizing or fracturing subterranean formations comprising injecting into the formation, a composition consisting essentially of a stable acidic gel made by the process of adding from about 25 to about 150 pounds of a linear polyacrylamide having a molecular weight of from about 1 to about 50 million to each 1000 gallons of an aqueous hydrochloric acid solution containing from about 25 to about 35 weight percent of hydrochloric acid. In another method of practicing the invention, the viscosity of the gelled acid is increased prior to injection into the formation by adding to the gel, an aldehyde compound soluble in aqueous solutions. An amount of the aldehyde equivalent to from about 0.01 to about 1.5 weight percent of aldehyde (based on the weight of hydrochloric acid used) is employed. Where this method of practicing the invention is used, the starting acid solution may have a concentration as low as 1 weight percent.

20 Claims, No Drawings

METHOD AND COMPOSITION FOR ACIDIZING AND FRACTURING WELLS

This invention relates to methods of treating subterranean strata to enhance the production of hydrocarbons therefrom, and more particularly, to methods for acidizing and acid fracturing, and to the compositions used in such methods.

Acidizing and acid fracturing are procedures employed in the recovery and production of hydrocarbons from subterranean formations. It is known that desirable controls of the etching or leaching action and mobility of the acid utilized in these techniques may be attained by modifying the physical properties of the acid composition which is injected into the formation so as to increase its viscosity, and in some instances, to reduce the frictional resistance offered to its movement into the interstices and pores of the formation. Gelling of the acid solution by the inclusion therein of certain swellable materials or gelling agents is sometimes employed. In such acid gels, the mobility of the acid ions which etch the formation is retarded or decreased, thus preventing the acid from becoming spent and inactive before it has been forced into the farthest reaches of the producing formation. Such gelling procedures also enable the development of higher pump pressures so that wider fractures can be obtained, and the live acid can be forced further from the well bore. Increasing the viscosity of the acid composition also permits better fluid loss control, in that, in acid fracturing, or in simple acidizing, the acid solution does not flow as readily into the relatively large pores of the formation with the consequent sacrifice of optimum permeability increase.

Among the methods which have been used to afford the described control of acidizing and acid fracturing procedures are the incorporation in the aqueous acid solution of guar gum or various cellulosic derivatives. These materials undergo swelling so that an increase in viscosity results, and a gel of limited stability is formed. At relatively high temperatures, or at relatively high acid concentrations, the gels thus produced lack adequate stability for many extended usages, and are therefore unsatisfactory for such usages.

It has also been proposed to use various polymeric materials for the purpose of forming gels or thickened acidic solutions for use in acidizing and acid fracturing. Although it is generally supposed that linear polyacrylamide homopolymers will not in themselves undergo significant swelling or effect satisfactory gelling of aqueous hydrochloric acid solutions, it has nevertheless been proposed to incorporate particulate polyacrylamide homopolymers in aqueous acid solutions, and particularly aqueous hydrochloric acid solutions, for the purpose of providing a suspension or dispersion which, when used in acidizing and acid fracturing, results in the lodgement of the polymer particles at selected zones in the formation, and thereby decreases undesirable fluid loss into these zones during such fracturing and acidizing. In the formation of dispersions or suspensions of the type described, the linear polyacrylamide is generally added to an acid solution containing about 15 weight percent acid.

In addition to acidic compositions prepared in the manner described for the purpose of improving the efficiency and control available in acidizing and acid fracturing techniques, it is known that limited cross linked polyacrylamides can be added to aqueous solutions of inorganic acids to form acidic gels useful in acidizing and fracturing of subterranean formations for the purpose of hydrocarbon production. When this technique is employed, the preferred acid concentration of the aqueous hydrochloric acid solution subjected to gelling in this way is reportedly about 15 weight percent.

The described compositions do not satisfactorily achieve several desiderata which must be considered in optimization of the acid gel in order to achieve efficient and satisfactory fracturing or acidizing under certain conditions of usage. Thus, from the standpoint of pumping requirements, fluid loss control and strength of acid employed, the previously known suspensions or dispersions of linear polyacrylamide homopolymers in 15 percent hydrochloric acid solutions provide a composition which, for many types of acid treatments, is inferior to a substantially homogeneous acid gel. Moreover, such dispersions generally involve a lower concentration of acid in the dispersion than is optimum for many types of acid treatment. The gels produced through the use of limited cross linked polyacrylamides also do not provide a sufficiently high acid concentration for some usages, and are more difficult and costly to prepare than such gels would be could straight chain or linear polyacrylamide homopolymers be used to yield a gel of equivalent homogeneity and viscosity. Finally, many situations of usage exist where acid gels having a higher viscosity than has been achieved by the use of any of the described methods would be desirable, and would yield superior results.

The present invention is based upon the discovery that useful acidic gels of satisfactory temperature and time stability can be obtained by adding from about 25 to about 150 pounds of a water soluble linear polyacrylamide polymer, having a molecular weight of from about 1 million to about 50 million, to each 1000 gallons of an aqueous hydrochloric acid solution. The acid concentration of the aqueous solution is from about 25 to about 35 weight percent. The acidic gel composition prepared in this way thus has a relatively high acidity, is homogeneous and demonstrates satisfactory time and temperature stability. Precipitation from the gel of solid particles, and conversion to a dispersion or suspension, are surprisingly avoided when the acid solutions to which the linear polyacrylamide polymer is added are between 25 and 35 weight percent acid concentration. Yet, as previous experience in the art would suggest, when the concentration of the acid is reduced below about 25 weight percent, undesirable precipitation of solid particles and breaking of the gel commences to occur in a relatively short time at bottom hole temperatures exceeding about 100°F.

In another aspect of the invention, it has been discovered that in instances where a very high viscosity gel is desirable in the context of usage, such high viscosity can be imparted to the gels made in the general manner described in the preceding paragraph by adding to such gels, from about 0.01 to about 1.5 weight percent of an aldehyde which is soluble in aqueous solutions. Preferably the aldehyde compound contains from 1 to about 10 carbon atoms, and, in general, the most suitable aldehydes are those which contain from 1 to about 6 carbon atoms. Addition of the aldehyde results in a very significant increase in the viscosity of the acid gel, and by reason of such increase in viscosity, enables the total amount of the polyacrylamide polymer employed in the first instance to produce the gel to be reduced, since the viscosity of the original gel is directly related to the amount of the polymer employed. Thus, through the described aldehyde treatment, the viscosity of the acid gel is greatly increased. Moreover, for many usages, a significant economy can be effected by reducing the amount of polyacrylamide polymer which would otherwise be required to produce a gel of sufficiently high viscosity.

It should be noted that, although the invention is considered to extend to the compositions constituted by the stable gels formed by the addition of polymer to acid solutions of at least 25 weight percent (acid concentration), the process of increasing the gel viscosity by reaction with aldehyde can be carried out by adding the aldehyde compound to relatively low stability gels derived from acid solutions having an acid concentration as low as about 1 weight percent, because the precipitation of some solid material and some degeneration of the heavy viscous gel product is tolerable in many uses of the high viscosity gel yielded by the aldehyde addition. Where the low concentration acid solution is used as a starting material, the aldehyde addition is preferably carried out relatively quickly after the acid solution and polyacrylamide are mixed, and before breaking of the gel has commenced. It should further be pointed out that in the method of preparing the high viscosity gels using the aldehyde compound, the sequence of component addition and mixing is not critical, although it is preferred to initially mix the polymer particles with the aqueous acid solution (before the aldehyde addition) in order to allow the polymer time to become thoroughly hydrated in the acid solution.

The invention also comprehends methods of using the compositions of the invention. The acid-polymer mixture can be initially pre-mixed, and then trucked to a well site at temperatures and within times which assure that the gel will not break, or solid particles precipitate therefrom. If the gel developed by mixing the aqueous acid solution with the linear polyacrylamide polymer is to be used without further increasing the viscosity by addition of an aldehyde, it can be pre-mixed to an acid:polymer ratio such that the gel, when disposed in the pores of the formation, or in an old fracture, or newly propagated fracture, will remain stable and will not commence to break until a sufficient period of time has elapsed to allow the acid to spend, or other sought result to be realized. Although chemical means for readily and easily breaking the gels of the invention are not presently known, there is a definite and repeatable correlation between gel stability, time and temperature so that generally, removal and inactivation of the gel by autobreaking can adequately be achieved in most situations of use.

Where very high viscosity acid gels are needed for a particular operation, such as fracturing and concurrently moving a proppant into the fracture, the acid-polymer composition can be pre-mixed and transported to the well site, or mixed at the site, and then the amount of aldehyde necessary to realize the desired increase in viscosity mixed with relatively low viscosity intermediate acid gel before injecting the high viscosity gel into the formation. Where a gel is needed having a viscosity even higher than is tolerable in order to facilitate pumping, the polymer and acid mix can be prepared and injected into the formation, and the aldehyde solution then pumped into the formation to achieve in situ mixing, and consequent in situ viscosity increase. The high viscosity gels can also be used as diverting fluids.

A more comprehensive understanding of the invention will be gained from the following detailed description of preferred embodiments of the invention, in both its method and composition aspects, and from the selected examples of the practice of the invention which follow. As is described in the foregoing discussion, two general categories of useful acid gel products are yielded by practicing the methods of the invention: one being the relatively low viscosity gel produced by mixing acid and polymer, and the other being the relatively high viscosity gel formed by reacting an aldehyde with the relatively low viscosity gel. The relatively low viscosity gel will, for convenience, hereinafter be sometimes referred to as the intermediate gel.

Considering initially the polymer used in the present invention for producing the acid gel, the polymers successfully employed are water soluble, linear polyacrylamide polymers having a molecular weight of from about 1 to about 50 million. Preferably, the polyacrylamides used have a molecular weight of from about 3 to about 6 million. The polyacrylamide polymers can be either nonionic, or may carry, in varying degrees, a cationic or anionic charge. In use, the polymer is comminuted to relatively small particles prior to addition to the aqueous acid solution. The particle size of the polymer particles is from about 40 to about 325 mesh, and is preferably from about 60 to about 200 mesh.

The polyacrylamide homopolymer is added to an acidic solution consisting essentially of hydrochloric acid in water. The beneficial effect of relatively small amounts of hydrofluoric acid and other acids in fracturing and acidizing operations is well known in the art, however, and the acid solution used in the present invention can contain small amounts of these acids, in addition to the hydrochloric acid. The acid solutions can also contain a corrosion inhibitor and non-emulsifying agents.

Where the high viscosity acid gel product derived from the previously described aldehyde treatment is to be prepared, the concentration of the aqueous acid solution to which the polymer is added can range from about 1 to about 35 weight percent, and is preferably from about 15 to about 35 weight percent. The aldehyde can be added relatively soon after mixing the polymer with the aqueous acid solution. This early addition of the aldehyde is preferred, particularly at low temperatures wherein the starting acid solution has a concentration in the range of from about 1 to about 25 weight percent. The gel resulting from addition of the polyacrylamide to a relatively low concentration of aqueous acid solution has a propensity to break and develop a solid precipitate; accordingly, where the intermediate or relatively less viscous acid gel is to be the end product, the acid concentration of the aqueous acid starting material is at least about 25 weight percent.

The amount of linear polyacrylamide polymer which is added to the aqueous hydrochloric acid solution can be varied over a wide range of from about 25 to about 150 pounds of polymer per 1000 gallons of 15-35 weight percent hydrochloric acid solution, or the equivalent. This can generally be equated to a polymer to acid weight ratio of from about 1:10 to about 1:125. Preferably from about 40 to about 100 pounds of polymer is utilized per 1000 gallons of an aqueous hydrochloric acid solution which contains from 15 to 35 weight percent acid. The amount of polymer used is directly related to the viscosity of the gel produced, with viscosity increasing as more of the polymer is added to an acid solution of a given concentration. In general, a gel of satisfactorily high viscosity can be produced using 50 pounds of polymer or less, if an adequate amount of aldehyde compound is employed in the final step.

The intermediate gels produced by the invention attain viscosities ranging from about 50 to about 500 centipoises, depending upon the amount of polymer used, the strength of the acid and the temperature employed. The latter two parameters are also correlated to the rate at which the gel reaches maximum viscosity and its time stability. At lower acid concentrations and lower temperatures, gelling occurs more slowly and maximum viscosity is more slowly reached. At relative lower temperatures, however, the gel will remain stable over a relatively longer time. In general, mixing of acid and polymer is preferably carried out at a temperature of from about 75° to about 130°F, and in most instances it is preferred to carry out the mixing at less than 100°F.

Mechanistically speaking, addition of the polyacrylamide polymer to the acid solution results in the formation of a hydrochloride salt of the polyacrylamide. Where the further optional step of addition of the aldehyde is carried out to greatly increase the viscosity of the acid gel, as hereinafter described in detail, a methylol hydrochloride salt of the polyacrylamide is produced.

In instances where it is desired that the acid gel composition to be used in fracturing or acidizing have a relatively high viscosity (as compared to the intermediate gel produced by reacting polyacrylamide with the acidic aqueous solution), the process of the invention then includes the further step of adding to the low viscosity gel initially yielded, an aldehyde compound which is soluble in aqueous solutions. Preferably, the aldehyde compound contains between 1 and about 10 carbon atoms. For example, formaldehyde, paraformaldehyde, acetaldehyde, propionaldehyde, aldol and glutaraldehyde are typical aldehyde compounds which may especially effectively employed for viscosity enhancement purposes. In general, and for most usage, aldehydes containing from 1 to 6 carbon atoms yield the best results. The generally most preferred aldehyde compound is formaldehyde, although propionaldehyde and glutaraldehyde have been found to more rapidly increase the viscosity of the gel, and to yield a relatively higher viscosity gel having a shorter lived stability. The latter characteristic is not a major consideration in the selection of the particular aldehyde to be used, however, for the attainment of viscositites of a magnitude exceeding that required for most fracturing and acidizing usages is easily possible with substantially all of the described aldehyde compounds. Thus, gels too viscous to facilitate pumping are easily attained by the use of relatively small amounts of most of the aldehydes, and such gels are therefore of utility primarily only when developed in situ at the point of functionality.

The quantity of aldehyde which is employed in the process of the invention can vary widely, and these compounds are generally effective in increasing, in some degree, the viscosity of the final product over that of the intermediate gel composition, even when added in miniscule amounts. This, of course, follows from the character of the occurring reaction which results in the formation of small amounts of the methylol hydrochloride salt, to which reference has previously been made. In general, however, an amount of from about 0.01 weight percent to about 1.5 weight percent of aldehyde, based on the weight of the hydrochloric acid in the acidic starting material, is utilized. Preferably, from about 0.1 weight percent to about 0.8 weight percent is employed. The use of amounts of aldehyde in excess of 1.5 weight percent, while not detrimental to the attainment of the objective of increased viscosity of the gel, is usually uneconomic, and not infrequently yields gels having viscosities so high that handling becomes difficult.

It has, moreover, been pointed out that the amount of aldehyde used is related to the amount of polyacrylamide initially employed, insofar as is concerned the viscosity of the product gel which is yielded. Thus, where relatively large amounts of the polymer have been used to form the intermediate gel, a relatively small amount of aldehyde is required to realize a desired ultimate viscosity in the final product gel. Increasing the amount of aldehyde used also has the effect of increasing the rate at which the viscosity of the reaction mixture increases. In general, and for most purposes, where an amount of 0.1 to 0.8 weight percent, based on the weight of the acid employed, of aldehyde is employed, it is unnecessary to use more than 50 pounds of polymer per 1000 gallons of acid solution in forming the intermediate gel, in order to produce a final product gel of satisfactorily high viscosity. For some types of usages, it is desirable that the viscosity of the final gel product increase at a relatively slow rate. In such cases, paraformaldehyde is the preferred aldehyde for use. Encapsulated aldehyde compounds which are released relatively slowly as the capsule is dissolved can also be beneficially employed in such instances.

The following examples will serve to more comprehensively illustrate the principles of the invention, but in being directed to certain specific compounds and process steps and conditions, are not intended to delimit and define the bounds of the inventive concepts here propounded.

EXAMPLE 1

25 Pounds of a commercially available, non-ionic linear polyacrylamide homopolymer having a molecular weight of between 5 and 6 million is added to 1000 gallons of an aqueous solution containing 15 weight percent HCl at a temperature of 120°F. An acid gel forms in about 45 minutes. After standing 15 hours at 120°F, however, a spongy mass of solids is observed to precipitate from the gel.

The same addition of polymer to aqueous acid solution is carried out at 180°F. A gel is rapidly formed, but the precipitation of solids therefrom, evidencing breakdown of the gel, commences to occur after about 1 hour.

EXAMPLE 2

25 Pounds of the polyacrylamide homopolymer described in Example 1 is added to 1000 gallons of an aqueous solution containing 30 weight percent HCl at a temperature of 200°F. A gel is formed which remains stable for 24 hours at 200°F and attains a viscosity of 200 centipoises. A comparison of Example 2 with Example 1 thus indicates that a stable acid gel can be produced from a 30 weight percent aqueous hydrochloric acid solution, though not from a 15 weight percent solution.

EXAMPLE 3

Two preparations of intermediate gels are carried out by adding 50 pounds of the polyacrylamide homopolymer described in Example 1 to two aqueous hydrochloric acid solutions, one of which contains 25 weight percent HCl, and the other of which contains 35 weight percent HCl. No precipitate of solids from either gel occurred at temperatures up to 300°F.

EXAMPLE 4

100 Pounds of the polymer described in Example 1 is introduced to each of two 1000 gallon quantities of a 30 weight percent aqueous hydrochloric acid solution at a temperature of 76°F. After allowing one hour for hydration of the polymer by the acid solution, 0.1 percent by volume (based on the volume of the acid solution) of a 37 weight percent aqueous solution of formaldehyde is added to one of the two 1000 gallon quantities of acid-polymer mixture. This is equivalent to 0.035 weight percent of formaldehyde, based upon the weight of HCl used. The viscosities of the two systems are then periodically compared. The data obtained is set forth in Table I.

Table I

| Time | Viscosity (Brookfield), Centipoises | |
|---|---|---|
| | Without Formaldehyde | With Formaldehyde |
| 15 minutes | 20 | 20 |
| 30 minutes | 51 | 48 |
| 1 hour | 180 | 160 |
| 1½ hour | 226 | 750 |
| 2½ hours | 226 | 100,000+ |

EXAMPLE 5

The test described in Example 4 in which formaldehyde is added to the intermediate gel is repeated, except that the polymer addition and formaldehyde addition are carried out at 150°F, and the viscosity is observed immediately after the 1 hour hydration period, and 5 minutes after addition of the formaldehyde, both at a temperature of 150°F. The viscosity of the intermediate gel after the one hour hydration period is 190 centipoises, and 5 minutes after addition of the formaldehyde is in excess of 100,000 centipoises. In comparing this result with those shown in Table I, it will be seen that the higher temperature results in a more rapid increase in viscosity, both of the intermediate gel following the addition of polymer to acid solution, and of the final gel following addition of the formaldehyde.

EXAMPLE 6

The test described in Example 5 is repeated except that a 15 weight percent HCl solution is utilized. After increasing very rapidly in viscosity immediately after the formaldehyde addition, the high viscosity gel is observed to commence to become spongy after about 2 hours, and to contain discrete solid particles after 3 hours. The particles, however, are well dispersed and suspended in the high viscosity spongy gel. Thus, the high viscosity and carrying capacity of the gel produced by the formaldehyde reaction permits the particle formation resulting when the 15 weight percent acid solution is used as a starting material to be tolerated.

EXAMPLE 7

A number of gel preparations are carried out in which 50 pounds of various polyacrylamides are each dissolved at a temperature of 76°F in 1000 gallons of an aqueous hydrochloric acid solution, with the acid concentration being varied in different runs. In a major portion of the runs, a 37 weight percent aqueous formaldehyde solution is added in varying volume percentages (based on the starting acid solution) to the acid solutions prior to the addition of polymer to the solutions. During gellation, the reaction mixtures are placed in a constant temperature bath set at different temperatures during the different runs. The viscosities of the various intermediate and high viscosity gel products are periodically measured with a Brookfield Viscometer capable of measuring viscosities up to 100,000 centipoises. The results of these measurements are tabulated in Table II.

TABLE II

| Polymer | Wt.% HCl | Wt.%[8] HCHO | Temp. Bath,°F | Viscosity in Poises × 10 as Measured at Indicated Time Intervals (In Hours) | | | | | | | | | | | | | |
|---|---|---|---|---|---|---|---|---|---|---|---|---|---|---|---|---|---|
| | | | | ¼ | ½ | 1 | 1½ | 2 | 2½ | 3 | 3½ | 4 | 4½ | 5 | 5½ | 6 | 6½ |
| A[1] | 5 | 0.8 | 75 | — | — | — | — | — | — | — | — | — | — | — | — | — | .034 |
| A | 5 | 0.2 | 130 | — | — | — | — | — | — | 1.3 | 32 | 100 | — | — | — | — | — |
| A | 5 | 0.4 | 130 | — | — | — | .065 | 8 | 100 | — | — | — | — | — | — | — | — |
| A | 5 | 0.8 | 130 | — | — | — | .4 | 100 | — | — | — | — | — | — | — | — | — |
| A | 5 | 0.2 | 200 | .15 | 100 | — | — | — | — | — | — | — | — | — | — | — | — |
| A | 5 | 0.4 | 200 | .34 | 100 | — | — | — | — | — | — | — | — | — | — | — | — |
| A | 15 | 0.38 | 75 | — | — | — | — | — | — | — | — | .067 | — | 9 | — | 50 | 50 |
| A | 15 | 0.76 | 75 | — | — | — | — | — | .63 | — | 64 | 100 | — | — | — | — | — |
| A | 15 | 0.0 | 130 | — | — | — | — | .014 | — | — | — | — | — | — | — | — | .008 |
| A | 15 | 0.19 | 130 | — | 3.2 | 100 | — | — | — | — | — | — | — | — | — | — | — |
| A | 15 | 0.38 | 130 | — | 7.3 | 100 | — | — | — | — | — | — | — | — | — | — | — |
| A | 15 | 0.76 | 130 | .4 | 100 | — | — | — | — | — | — | — | — | — | — | — | — |
| A | 15 | 0.19 | 200 | 100 | — | — | — | — | — | — | — | — | — | — | — | — | — |
| A | 15 | 0.38 | 200 | 100 | — | — | — | — | — | — | — | — | — | — | — | — | — |
| B[2] | 5 | 0.2 | 130 | — | — | — | — | — | — | — | — | — | — | 3.4 | — | 13 | 100 |
| B | 5 | 0.4 | 130 | — | — | — | — | — | — | — | — | — | — | 5.2 | — | 100 | — |
| B | 5 | 0.2 | 200 | — | 1.3 | 100 | — | — | — | — | — | — | — | — | — | — | — |
| B | 15 | 0.0 | 130 | — | — | — | — | — | — | — | — | — | — | — | — | — | .010 |
| B | 15 | 0.38 | 130 | — | .8 | 100 | — | — | — | — | — | — | — | — | — | — | — |
| C[3] | 1 | 0.81 | 200 | — | — | .027 | — | 3 | — | 50 | — | 100 | — | — | — | — | — |
| C | 2 | 0.4 | 200 | — | — | .034 | — | 10 | — | 48 | — | 60 | — | 40 | — | — | — |
| C | 2 | 0.8 | 200 | — | — | 30 | 60 | 100 | — | — | — | — | — | — | — | — | — |
| C | 5 | 0.4 | 130 | — | — | — | — | — | — | — | — | — | — | 5.15 | 18 | — | 100 |
| C | 5 | 0.8 | 130 | — | — | — | — | — | 2 | — | 5 | 100 | — | — | — | — | — |
| C | 5 | 0.2 | 200 | .063 | 33 | 100 | — | — | — | — | — | — | — | — | — | — | — |
| C | 15 | 0.0 | 130 | — | — | — | — | .029 | — | — | — | — | — | — | — | — | .016 |
| C | 15 | 0.38 | 130 | — | .72 | 11 | 100 | — | — | — | — | — | — | — | — | — | — |
| C | 15 | 0.19 | 200 | 100 | — | — | — | — | — | — | — | — | — | — | — | — | — |

TABLE II-continued

| Polymer | Wt.% HCl | Wt.%[8] HCHO | Temp. Bath,°F | Viscosity in Poises × 10 as Measured at Indicated Time Intervals (In Hours) | | | | | | | | | | | | | |
|---|---|---|---|---|---|---|---|---|---|---|---|---|---|---|---|---|---|
| | | | | ¼ | ½ | 1 | 1½ | 2 | 2½ | 3 | 3½ | 4 | 4½ | 5 | 5½ | 6 | 6½ |
| D[4] | 5 | 0.4 | 130 | — | — | — | — | — | — | — | — | — | — | 6.6 | 9 | 100 | — |
| D | 5 | 0.8 | 130 | — | — | — | — | — | — | — | 7 | — | 100 | — | — | — | — |
| D | 5 | 0.2 | 200 | — | 2 | 100 | — | — | — | — | — | — | — | — | — | — | — |
| D | 15 | 0.0 | 130 | — | — | — | — | .054 | — | — | — | — | — | — | — | — | .036 |
| D | 15 | 0.38 | 130 | — | .6 | 100 | — | — | — | — | — | — | — | — | — | — | — |
| D | 15 | 0.19 | 200 | 8.8 | 100 | — | — | — | — | — | — | — | — | — | — | — | — |
| E[5] | 5 | 0.4 | 130 | — | — | — | — | 1.4 | 24 | 100 | — | — | — | — | — | — | — |
| E | 5 | 0.8 | 130 | — | — | 7 | 20 | 100 | — | — | — | — | — | — | — | — | — |
| E | 5 | 0.2 | 200 | 1.1 | 22 | 100 | — | — | — | — | — | — | — | — | — | — | — |
| E | 15 | 0.0 | 130 | — | — | — | — | .071 | — | — | — | — | — | — | — | — | .034 |
| E | 15 | 0.38 | 130 | — | .9 | 100 | — | — | — | — | — | — | — | — | — | — | — |
| E | 15 | 0.19 | 200 | 15 | 100 | — | — | — | — | — | — | — | — | — | — | — | — |
| F[6] | 15 | 0.38 | 130 | .365 | 100 | — | — | — | — | — | — | — | — | — | — | — | — |
| G[7] | 15 | 0.38 | 130 | — | 3 | 100 | — | — | — | — | — | — | — | — | — | — | — |

[1]Polymer A is a commercially available straight chain, non-ionic polyacrylamide homopolymer having a molecular weight of about 6 million.
[2]Polymer B is a commercially available straight chain polyacrylamide copolymer having a molecular weight between 3 million and 6 million and formed by interpolymerizing polyacrylamide similiar to Polymer A with a straight chain cationic polyacrylamide monomer in a weight ratio of about 1:4 Polymer A to cationic monomer. is about 1:2.
[3]Polymer C is a commerically available straight chain polyacrylamide copolymer similar to Polymer B, except that the weight ratio of Polymer A to cationic monomer
[4]Polymer D is a commercially available straight chain polyacrylamide copolymer similar to Polymers B and C, except that the weight ratio of Polymer A to cationic monomer is about 1:1.
[5]Polymer E is a commercially available straight chain polyacrylamide copolymer similar to Polymer D, except that the weight ratio of Polymer A to cationic monomer is about 2.5:1.
[6]Polymer F is a commercially available straight chain sodium polyacrylamide homopolymer having a molecular weight of from about 3 million to about 5 million.
[7]Polymer G is a commercially available straight chain copolymer of acylamide and methacrylyloxyethyl-trimethylammonium methyl sulfate and has a molecular weight of about 5 million.
[8]The weight percent formaldehyde is based upon the weight of the hydrochloric acid utilized.

From the data set forth in Table II, it will be clearly apparent that at least a 1000-fold increase in viscosity can generally be derived from the addition of a small amount of formaldehyde to the intermediate gel. Moreover, the rate at which the viscosity increases is very temperature dependent, increasing quite rapidly with increase in temperature. Increasing the amount of formaldehyde, or the amount of acid, is shown to increase the rate at which the viscosity increases.

EXAMPLE 8

Two further runs at temperatures of 130° and 200°F are carried out using Polymer D described in Example 7, and under conditions identical to those described in Example 7, except that only 25 pounds of polymer are added to 15 weight percent acid solutions containing, in each case, 0.38 weight percent of formaldehyde, based on the weight of the acid. In the run in which gelling was effected at 130°F, a maximum viscosity of 350 centipoises is reached after 3 hours, and the viscosity of the gel then begins to decrease, indicative of decrease of stability and commencement of breaking. In the run in which gelling is carried out at 200°F, the highest viscosity attained is 190 centipoises reached in 15 minutes. Again, a sharp decrease in viscosity is noted immediately after the maximum viscosity is reached. These results indicate that maximum viscosity increase occurs when amounts of polymer exceeding 25 pounds per 1000 gallons of acid solution are utilized, and also that the rate at which maximum viscosity is achieved is substantially increased with the increase of the temperature at which the gelling reaction between the formaldehyde, polymer and acid is carried out.

EXAMPLE 9

High viscosity gels are prepared by adding, at 76°F, various aldehyde compounds to intermediate gels resulting from the addition of 50 pounds of Polymer D, identified in Example 6, to 1000 gallons of a 15 weight percent aqueous hydrochloric acid solution. In each run, 10 gallons of the aldehyde are utilized. Immediately after the aldehyde is added, the gel system is placed in a 130°F bath, and periodic viscosity measurements are commenced using a Brookfield Viscometer. The results obtained are set forth in Table III.

TABLE III

| Time Minutes | T,°F | Viscosity (Poise × 10) | | | |
|---|---|---|---|---|---|
| | | Formaldehyde[1] | Propionaldehyde[2] | Aldol[3] | Glutaraldehyde[4] |
| 0 | 76 | 0.06 | 0.06 | 0.06 | 0.06 |
| 5 | 92 | 0.06 | 0.06 | 0.06 | 0.06 |
| 10 | 104 | 0.06 | 0.08 | 0.06 | 0.06 |
| 15 | 109 | 0.06 | 1.2 | 0.24 | 1.9 |
| 20 | 114 | 0.06 | 20 | 1.1 | 19.4 |
| 25 | 116 | 0.06 | 42 | 8.5 | 22 |
| 30 | 118 | 0.08 | 100+ | 15 | 28 |
| 35 | 125 | 0.24 | 100+ | 30 | 100+ |
| 40 | 126 | 1.4 | 100+ | 75 | 100+ |
| 45 | 127 | 4.5 | 100+ | 99 | 80 |
| 50 | 128 | 100+ | 100+ | 100+ | 73 |
| 60 | 130 | 100+ | 60 | 100+ | 62 |

[1]The formaldehyde is a 37 weight percent aqueous solution of the specific gravity 1.09.
[2]Pure (100%) propionaldehyde of specific gravity 0.807.
[3]Pure (100%) aldol of specific gravity 1.103.
[4]The glutaraldehyde is a 25% aqueous solution of specific gravity 1.06.

EXAMPLE 10

A series of runs are carried out under conditions identical to those described in Example 9, except that the described formaldehyde solution is used in all runs, and the amount of the polyacrylamide mixed with the acid in the several runs is varied. The gel temperature and viscosity measurements obtained appear in Table IV.

TABLE IV

| Time, Minutes | T,°F | Viscosity (Poise × 10) | | | | |
|---|---|---|---|---|---|---|
| | | 30 lbs. Polymer | 40 lbs Polymer | 50 lbs. Polymer | 100 lbs Polymer | 150 lbs Polymer |
| 0 | 76 | 0.03 | 0.04 | 0.06 | 0.12 | 0.7 |
| 15 | 108 | 0.03 | 0.04 | 0.06 | 0.12 | 1.7 |
| 30 | 120 | 0.06 | 0.12 | 0.08 | 30 | 100+ |
| 40 | 125 | 0.15 | 0.9 | 1.4 | 100+ | 100+ |
| 45 | 126 | 0.64 | 1.5 | 4.5 | 100+ | 100+ |

TABLE IV-continued

| Time, Minutes | T,°F | Viscosity (Poise × 10) | | | | |
|---|---|---|---|---|---|---|
| | | 30 lbs. Polymer | 40 lbs Polymer | 50 lbs. Polymer | 100 lbs Polymer | 150 lbs Polymer |
| 50 | 127 | 0.82 | 5.7 | 100+ | 100+ | 100+ |
| 55 | 128 | 1.1 | 6.5 | 100+ | 100+ | 100+ |
| 60 | 129 | 1.2 | 7.7 | 100+ | 100+ | 100+ |
| 70 | 130 | 1.5 | 42 | 100+ | 100+ | 100+ |
| 80 | 130 | 2.0 | 90 | 100+ | 100+ | 100+ |
| 90 | 130 | 2.6 | 100+ | 100+ | 100+ | 100+ |
| 100 | 130 | 0.16 | 100+ | 100+ | 100+ | 100+ |
| 120 | 130 | — | 100+ | 100+ | 100+ | 100+ |
| 150 | 130 | — | 60 | 100+ | 100+ | 100+ |

It is seen that under the described conditions, at least 40 pounds of the polymer per 1000 gallons of acid solution are required in order to achieve the desired high viscosity in the product gel.

EXAMPLE 11

A series of preparations of acid gels are carried out in the same manner as that described in Examples 9 and 10, utilizing the same polyacrylamide and 0.35 weight percent of formaldehyde (based on the acid weight), but employing 30 weight percent HCl solution, rather than the 15 weight percent solution used in the runs described in Example 10. The weight of polymer added to the acid solution is varied from 25 to 50 pounds per thousand gallons of acid solution. The viscosities measured at periodic intervals while the gel developed in a 130°F bath are set forth in Table V.

TABLE V

| Time Minutes | T,°F | Viscosity (Poise × 10) | | | |
|---|---|---|---|---|---|
| | | 25 lbs. of Polymer | 30 lbs. of Polymer | 40 lbs. of Polymer | 50 lbs. of Polymer |
| 0 | 76 | 0.02 | 0.03 | 0.04 | 0.06 |
| 5 | 98 | 0.03 | 0.03 | 0.05 | 0.08 |
| 10 | 105 | 0.03 | 0.03 | 0.06 | 0.3 |
| 15 | 112 | 0.03 | 0.03 | 1.76 | 10 |
| 20 | 116 | 0.03 | 0.03 | 45 | 100+ |
| 25 | 118 | 0.05 | 0.36 | 85 | 100+ |
| 30 | 120 | 0.03 | 0.76 | 100+ | 100+ |
| 40 | 124 | 0.02 | 0.56 | 100+ | 100+ |
| 60 | — | — | — | 100+ | 100+ |
| 90 | — | — | — | 65 | 75 |

The data in Table V show that for the development of a high viscosity final gel at 130°F and using 0.35 weight percent of formaldehyde, it is preferable to use at least 40 pounds of polymer for each 1000 gallons of 30 weight percent acid solution, even when 30 weight percent acid solution is used.

EXAMPLE 12

Tests are conducted to determine the effectiveness of various concentrations of formaldehyde in developing high viscosity gels. A 30 weight percent aqueous solution of HCl is employed, and 50 pounds of the polyacrylamide used in Examples 8–10 are mixed with 1000 gallons of the acid solution in each run. Final gellation is developed at a temperature of 130°F. The viscosities are periodically measured in the manner hereinbefore described. The data obtained appear in Table VI.

TABLE VI

| Time, Minutes | T,°F | Viscosity (Poise × 10) Weight Percent Formaldehyde Used | | | |
|---|---|---|---|---|---|
| | | 0 | 0.07 | 0.18 | 0.35 |
| 0 | 76 | 0.06 | 0.06 | 0.06 | 0.06 |
| 5 | 98 | 0.06 | 0.06 | 0.06 | 0.08 |
| 10 | 106 | 0.06 | 0.05 | 0.06 | 0.3 |
| 15 | 112 | 0.06 | 0.04 | 0.14 | 10 |

TABLE VI-continued

| Time, Minutes | T,°F | Viscosity (Poise × 10) Weight Percent Formaldehyde Used | | | |
|---|---|---|---|---|---|
| | | 0 | 0.07 | 0.18 | 0.35 |
| 20 | 115 | 0.06 | 0.16 | 1.6 | 100+ |
| 25 | 117 | 0.04 | 15 | 72 | 100+ |
| 30 | 120 | 0.04 | 45 | 100+ | 100+ |
| 35 | 125 | — | 68 | 100+ | 100+ |
| 40 | 126 | — | 98 | 100+ | 100+ |
| 45 | 127 | — | 100+ | 100+ | 100+ |
| 60 | 130 | — | 100+ | 100+ | 100+ |

The tabulated viscosity measurements show quite clearly that increasing the amount of formaldehyde utilized results in a corresponding increase in the rate at which a very high viscosity gel is developed at 130°F.

EXAMPLE 13

Two runs were carried out using 50 pounds and 100 pounds, respectively, (per 1000 gallons of acid solution) of a commercially available, non-ionic straight chain polyacrylamide homopolymer having a molecular weight of about 2 million. In each run, a 15 weight percent hydrochloric acid solution was used, and 0.38 weight percent formaldehyde, based on acid weight, was added to the intermediate gel. After the formaldehyde addition, the mixture was placed in a 130°F bath, and the viscosity and temperature of the developing gel were periodically measured. The results are set forth in Table VII.

TABLE VII

| Time Minutes | T,°F | Brookfield Viscosity (Poise × 10) Weight of Polymer Used, Lbs/1000 Gallons | |
|---|---|---|---|
| | | 50 | 100 |
| 0 | 76 | 0.02 | 0.03 |
| 10 | 107 | 0.02 | 0.03 |
| 20 | 118 | 0.02 | 0.03 |
| 30 | 125 | 0.02 | 40 |
| 40 | 130 | — | 100+ |
| 60 | 130 | 0.58 | — |
| 90 | 130 | 0.10 | — |

EXAMPLE 14

50 Pounds of a straight chain polyacrylamide homopolymer having a molecular weight of about 50 million are added to 1000 gallons of a 15 weight percent hydrochloric acid solution. 0.38 weight percent formaldehyde, based on acid weight, is added to the intermediate gel and the mixture placed in a 130°F bath. The periodic temperature and viscosity measurements taken are recorded in Table VIII.

TABLE VIII

| Time, Minutes | T,°F | Brookfield Viscosity (Poise × 10) |
|---|---|---|
| 0 | 76 | 0.2 |
| 10 | 107 | 0.3 |
| 20 | 118 | 3.0 |
| 30 | 125 | 80.0 |
| 35 | 128 | 100+ |

Although certain preferred embodiments of the present invention have been herein described in order to illustrate the basic principles underlying the invention, it will be understood that various changes or modifications can be effected in the specified reactants and process conditions without departure from such principles. Changes and innovations of this type are therefore contemplated as being within the spirit and scope of the invention, except as they may be necessarily excluded by the appended claims, or reasonable equivalents thereof.

What is claimed is:

1. A method for preparing a gelled acid useful for acidizing or fracturing subterranean earth formations, which comprises:
    mixing a water soluble, linear polyacrylamide having a molecular weight in the range of about 1 to about 50 million, an aqueous hydrochloric acid solution containing an amount of hydrochloric acid effective to produce a substantially homogeneous gel, and an aldehyde compound soluble in aqueous solutions;
    wherein the mixing ratio of said polyacrylamide to said acid solution is in the range of about 25 to about 150 pounds of said polyacrylamide per 1,000 gallons of said acid solution.

2. The method defined in claim 1 wherein said aqueous hydrochloric acid solution contains at least 1 weight percent hydrochloric acid.

3. The method defined in claim 2 wherein said aldehyde compound contains from 1 to about 10 carbon atoms, and from about 0.01 weight percent to about 1.5 weight percent of said aldehyde compound is utilized, based upon the weight of hydrochloric acid in the acid solution.

4. The method defined in claim 2 wherein said aldehyde compound is formaldehyde.

5. The method defined in claim 2 wherein said aldehyde compound is paraformaldehyde whereby the rate at which a high viscosity acid gel product is developed is substantially decreased.

6. The method defined in claim 3 wherein about 0.35 weight percent of said aldehyde compound is utilized, based upon the weight of hydrochloric acid in the acid solution, and less than 50 pounds of polyacrylamide are mixed with the acid solution and aldehyde.

7. The method defined in claim 2 wherein the polyacrylamide and acid are first mixed with each other, and the aldehyde compound is then added to the polymer-acid reaction mixture after a period of time sufficient for substantially complete hydration of the polymer by the acid solution.

8. The method defined in claim 2 wherein the acid solution contains less than about 25 weight percent hydrochloric acid, and said aldehyde is mixed with said acid solution before said polyacrylamide is mixed therewith.

9. The method defined in claim 3 wherein said acid solution contains at least 30 weight percent hydrochloric acid, the aldehyde utilized is propionaldehyde, and said method is further characterized in including the step of subjecting said mixture to a temperature of at least 130°F immediately after the polymer, acid solution and propionaldehyde are mixed, whereby a high viscosity acid gel is developed at a very rapid rate.

10. The method defined in claim 3 wherein said mixing is carried out at a temperature of less than 100°F whereby the development of said gel and its rate of attainment of maximum viscosity are retarded.

11. The method defined in claim 3 wherein said aldehyde compound is paraformaldehyde whereby the rate of attainment of the maximum viscosity of the final gel product is retarded.

12. The method of treating a permeable, subterranean formation to enhance the productivity of hydrocarbons therefrom which comprises:
    mixing from about 25 to about 150 pounds of a water soluble linear polyacrylamide having a molecular weight of from about 1 to about 50 million with each 1,000 gallons of a composition consisting essentially of an aqueous hydrochloric acid solution containing at least 25 weight percent hydrochloric acid to develop a stable, pumpable acid gel;
    injecting said stable, pumpable acid gel into the interstices of said permeable, subterranean formation; then
    injecting an effective amount of an aldehyde compound soluble in aqueous solutions into the interstices of the permeable formation to mix the aldehyde with the pumpable acid gel in situ, and thereby increase the viscosity of the gel present in the formation interstices by in situ reaction of the aldehyde compound with the pumpable acid gel.

13. The method defined in claim 12 wherein the aldehyde compound utilized is formaldehyde, and the quantity injected is at least 0.1 weight percent, based upon the total weight of acid in the pumpable acid gel injected into the formation.

14. The method defined in claim 12 and further characterized as including the steps of:
    measuring the temperature of the formation at the location where said pumpable acid gel is injected thereinto; and
    selecting the amount and type of said aldehyde compound for injection to develop, in situ, a high viscosity gel breaking after a desired time interval at said measured temperature.

15. A high viscosity acidic gel composition useful in fracturing, acidizing and propping operations in the production of hydrocarbons from subterranean formations consisting essentially of a methylol hydrochloride salt of a linear polyacrylamide having a molecular weight exceeding 1 million and produced by reacting a water soluble linear polyacrylamide having a molecular weight of from about 1 to about 50 million with hydrochloric acid in an aqueous environment to yield a hydrochloride salt of said linear polyacrylamide, then, reacting an aldehyde compound soluble in aqueous solutions with said hydrochloride salt.

16. A high viscosity acidic gel composition as defined in claim 15 wherein said linear polyacrylamide has a molecular weight of from about 3 to about 6 million.

17. A high viscosity acidic gel as defined in claim 15 wherein said aldehyde compound is selected from the group consisting of formaldehyde, paraformaldehyde, propionaldehyde, aldol, and glutaraldehyde.

18. A high viscosity acidic gel composition as defined in claim 15 wherein said gel composition has a viscosity of at least 100,000 centipoises.

19. A high viscosity acidic gel composition as defined in claim 15 wherein said reaction of linear polyacrylamide with hydrochloric acid is carried out by mixing from 25 to 150 pounds of the polyacrylamide with an aqueous hydrochloric acid solution containing at least 15 weight percent hydrochloric acid.

20. A high viscosity acidic gel composition as defined in claim 17 wherein said aldehyde compound is formaldehyde.

* * * * *